US008946973B2

United States Patent
Pelletier

(10) Patent No.: US 8,946,973 B2
(45) Date of Patent: Feb. 3, 2015

(54) DEVICE FOR CHANGING THE OPERATIONAL STATE OF AN APPARATUS

(75) Inventor: Sebastien Pelletier, Issy-les-Moulineaux (FR)

(73) Assignee: Elo Touch Solutions, Inc., Menlo Park, CA (US)

( * ) Notice: Subject to any disclaimer, the term of this patent is extended or adjusted under 35 U.S.C. 154(b) by 401 days.

(21) Appl. No.: 13/002,838

(22) PCT Filed: Jul. 6, 2009

(86) PCT No.: PCT/EP2009/004880
§ 371 (c)(1),
(2), (4) Date: Feb. 7, 2011

(87) PCT Pub. No.: WO2010/003622
PCT Pub. Date: Jan. 14, 2010

(65) Prior Publication Data
US 2011/0115335 A1   May 19, 2011

(30) Foreign Application Priority Data
Jul. 7, 2008 (EP) .................................... 08290665

(51) Int. Cl.
*H01L 41/107* (2006.01)
*G06F 1/32* (2006.01)
(Continued)

(52) U.S. Cl.
CPC .............. *G06F 1/3203* (2013.01); *G06F 1/325* (2013.01); *G06F 3/0416* (2013.01); *H02J 9/005* (2013.01)
USPC ........................................... 310/319; 310/318

(58) Field of Classification Search
CPC . H01L 41/1132; H01L 41/044; H01L 41/107; H01L 41/042

USPC .................................................. 310/319, 318
See application file for complete search history.

(56) References Cited

U.S. PATENT DOCUMENTS 7,176,902 B2 *   2/2007   Peterson et al. .............. 345/173
7,375,535 B1     5/2008   Kutz et al.
(Continued)

FOREIGN PATENT DOCUMENTS

DE   202 03 615 U1   7/2002
DE   101 42 087 A1   3/2003
(Continued)

OTHER PUBLICATIONS

Office Action for Japanese Application No. 2011-517018; dated Sep. 3, 2013.
(Continued)

*Primary Examiner* — Thomas Dougherty
*Assistant Examiner* — Bryan Gordon
(74) *Attorney, Agent, or Firm* — Alston & Bird LLP

(57) ABSTRACT

The invention relates to a device for changing the operational state of an apparatus, in particular from a stand-by or power down mode into an active state, which, in order to reduce power consumption during a stand-by mode and, furthermore, in order to reduce accidental powering up of the apparatus, comprises at least one means for transforming a mechanical excitation, in particular applied to the surface of the apparatus, into an electric signal and a power providing means for supplying at least a part of, in particular all, the electric power necessary to enable a change of the operational state of the apparatus wherein the electric power is obtained out of the electric signal. The invention, furthermore, relates to any apparatus comprising this device for changing operational state and a corresponding method.

19 Claims, 5 Drawing Sheets

(51) Int. Cl.
*G06F 3/041* (2006.01)
*H02J 9/00* (2006.01)

(56) References Cited

U.S. PATENT DOCUMENTS

| | | | |
|---|---|---|---|
| 7,411,584 B2* | 8/2008 | Hill et al. | 345/177 |
| 2004/0016298 A1* | 1/2004 | Scott | 73/602 |
| 2005/0146220 A1* | 7/2005 | Hamel et al. | 307/44 |
| 2006/0238069 A1* | 10/2006 | Maruyama et al. | 310/316.01 |
| 2007/0080608 A1 | 4/2007 | Maruyama et al. | |
| 2007/0257634 A1* | 11/2007 | Leschin et al. | 320/107 |
| 2008/0019122 A1* | 1/2008 | Kramer | 362/154 |
| 2010/0103127 A1* | 4/2010 | Park et al. | 345/173 |
| 2010/0141580 A1* | 6/2010 | Oh | 345/158 |

FOREIGN PATENT DOCUMENTS

| | | |
|---|---|---|
| JP | 58-103015 A | 6/1983 |
| JP | 10-055229 A | 2/1998 |
| JP | 2005-100917 A | 4/2005 |
| JP | 2006-048302 A | 2/2006 |

OTHER PUBLICATIONS

European Search Report for EP 08290665 (priority application for the above-identified application), Dec. 18, 2008.

PCT Search Report for PCT/EP2009/004880, Oct. 26, 2009.

M. Takeuchi et al., Piezoelectric Generator as Power Supply for RFID-Tags and Applications, Proc. IEEE Ultrasonics Symposium, New York City, USA, Oct. 28-31, 2007, pp. 2558-2561.

M. Umeda et al., Analysis of the Transformation of Mechanical Impact Energy to Electric Energy Using Piezoelectric Vibrator, Jpn. J. Appl. Phys., vol. 35 (1996), pp. 3267-3273, Part 1., No. 5B, May 1996.

M. Umeda et al., Energy Storage Characteristics of a Piezo-Generator Using Impact Induced Vibration, Jpn. J. Appl. Phys., vol. 36 (1997), pp. 3146-3151, Part 1., No. 5B, May 1997.

Chapter 36 (2-D Tactile Sensors and Sensor Arrays) of K.Machida & J. Kent excerpted from Nanoelectronics and Information Technology, Edited by R.Waser, Wiley-VCH publisher, 2003, pp. 867-879.

\* cited by examiner

DEVICE FOR CHANGING THE OPERATIONAL STATE OF AN APPARATUS

CROSS-REFERENCE TO RELATED APPLICATIONS

The present application is a national stage entry of PCT/EP2009/004880, which claims priority to European patent application 08290665.2 filed Jul. 7, 2008.

BACKGROUND

The invention relates to a device for changing the operational state of an apparatus, in particular from a stand-by or power down mode into an active state.

Electronic devices are consuming electric power even when they are turned into stand-by or power down modes and thus energy is unnecessary wasted. For example, electronic devices with a man-machine interface, such as mechanic buttons or sensitive touch interfaces, need electric power to enable the wake-up to bring the device out of the stand-by mode into an active state. For capacitive touch screens for instance, a polling of the capacitance value can sense a touch on the surface leading to a signal for the wake-up of the system. Such a mechanism needs electronic components, such as dedicated microcontrollers. Even if these components are in power down mode, they are still power consuming when waiting for any input on the corresponding man-machine interface. Also other sensitive touch surface device technologies, such as resistive, surface acoustics waves or infrared, have wake-up capabilities that consume electric power when they are in stand-by mode.

One of the reasons why electric power is necessary is that the wake-up modules of these devices comprise sophisticated signal processing to be able to take the decision to wake-up a system following an analysis of the sensed input signals. To do this analysis, electric power is consumed which comes from the power supply. For remotely controlled electronic devices, it has been proposed to use the energy of the electromagnetic waves received from the corresponding remote control unit, but for devices without a remote control, this solution does not make sense. In addition, to provide the electromagnetic waves, the remote control unit itself consumes power.

Other remote controlled devices use the energy provided in air-borne sound to wake-up low power consuming elements. For electronic devices with a man-machine interface, this kind of wake-up is also not suitable as, in a noisy environment, the devices would be turned into an active state without a user having the intention to do so. Furthermore the generated energy level is typically too low for most of the applications.

SUMMARY OF THE INVENTION

Starting therefrom, it is the object of the present invention to provide a device for changing the operational state of an apparatus which can reduce the continuous power consumption in a stand-by or power down mode of an apparatus and which has a reduced exposure to unintentional waking-ups of the apparatus due to ambient noise.

This object is achieved with the device described herein. Accordingly, the device for changing the operational state of an apparatus, in particular from a zero power, stand-by or power down mode into an active state, comprises at least one means for transforming a mechanical excitation, in particular applied to the surface of the apparatus, into an electrical signal and a power providing means for supplying at least a part of, in particular all, the electric power necessary to enable a change of the operational state of the apparatus, wherein the electrical power is obtained out of the electric signal.

By doing so, the kinetic energy provided e.g. by a finger or a stylus, which physically contacts the surface of the apparatus, can be used after transformation in an electric signal to provide the necessary energy to change the operation state, in particular as described above from a zero power or stand-by mode to an active state of the apparatus. By using the energy provided by the user, the power consumption during such a power, stand-by or power down state can be further reduced or even brought down to zero and an unintentional operational state change can be prevented as the changing of states needs the physical activity of a user.

In this context "stand-by" or "sleep mode" or "power down mode" is a low power mode for electronic devices, such as computers, televisions and remote controlled devices. These modes save electrical consumption compared to leaving a device fully on, but devices in sleep mode still consume significant amounts of energy. Stand-by mode is supposed to place electronic devices into a state of "waiting for a power-up" command. In contrast thereto, in a "Zero power mode", electronic devices consume zero energy and are entirely switched off.

In this context, the mechanical excitation can be a static (e.g. pressing), a dynamic (e.g. knocking) or a moving (e.g. sliding of a finger on the surface) excitation carried out by a part of the body of a user or a tool directly on the surface of the apparatus, e.g. on the housing or more in particular on a man machine interface of the apparatus.

In the case that more than one means for transforming a mechanical excitation with an electric signal is used, the electric power is obtained out of at least one of these signals but preferably out of all the electric signals to be able to optimize the energy transformation.

Preferably, the means for transforming can comprise an inductor. Thus, by using the effect of induction, kinetic energy can be transformed into electric energy which can then be used to power up the apparatus.

According to an advantageous variant, the means for transforming can comprise a passive transducer, in particular a piezoelectric transducer. The transducer can transform the physical information generated, for example by the kinetic energy of knocking, into an electric signal. As a passive device not needing to have its own power supply, the piezoelectric sensor is promising as it has a high degree of efficiency and a longer life time than standard mechanical buttons.

Preferably, the piezoelectric transducer can be configured to function in bending mode. In bending mode, optimized energy transfer is achieved by the piezoelectric element so that more electric power can be extracted out of the interactional energy provided by the user of the apparatus. It therefore becomes possible to extract all the power necessary to change the operational state, such as from a zero power mode into an active state.

Advantageously, the means for transforming can furthermore comprise a means for amplifying the excitation. Even further preferred is a mechanical amplification which is achieved by a special mount of the transducer leading to an improved sensed signal, and as a consequence to a higher power extraction.

Advantageously, the power providing means can comprise a voltage peak preventing means, in particular a varistor or a low drop out (LDO) voltage regulator. Indeed, the sensed signal, which depends on the intensity and the way the mechanical excitation is exerted on the surface or the man-machine interface of the apparatus, needs to be reshaped to provide a stable energy output. In case of a direct impact on piezoelectric sensors, the output signal can be relatively high, in particular above 10 Volts which, for example, cannot be used to supply an electronic device allowing a maximum value of 5 Volts or 3.3 Volts without the occurrence of damages. Whereas passive components such as capacitances, resistors or inductors may also be used to filter out surge voltage, improved results can be achieved with a varistor which shunts the current created by the high surge voltage away from the sensitive components of the apparatus. Typically, the varistor used in embodiments of the invention is chosen to clamp the output of the power providing means to a maximum value of about 5 Volts. A 3.3 Volts low drop out voltage regulator can clamp the output to a maximum value of about 3.3 Volts. Compared to the varistor, the LDO voltage regulator has the advantage that the power in surge voltage signals is not shunt to the ground.

Advantageously, the power providing means can further comprise a rectifier, in particular a bridge rectifier. With this additional element it is possible to further optimize the energy obtained out of the electric signal/signals of the transducer/s. The rectifier allows to exploit both positive and negative parts of the signals. A better efficiency is obtained thanks to the use of a Schottky diode bridge (Graetz circuit), having the particularity of a very low built-in potential (from 0.15 to 0.45 Volts) corresponding to the ON voltage of the diode.

According to a preferred embodiment, the power providing means can further comprise an energy storage means, in particular at least one capacitor. Using such a storage means, the energy provided in the signal can be accumulated, just like in a battery, so that, at the output of the power providing means, a suitable output can be provided to enable the change of the operational state. The properties of the storage means are determined depending on the consumption of the part of the apparatus which will use the output provided by the power providing means. A balanced choice needs to be made as, for example, in case of a capacitance, it should not be too large as the voltage will not be greater than the minimum value needed to power up the system. If, in contrast, the capacitance is too small, the output will not be smooth enough to correctly power the system.

According to a further preferred embodiment, the device can comprise a wake-up means configured to generate a wake-up signal for changing the operational state of at least a subsystem of the apparatus. The wake-up unit, as soon as it has received the necessary electric power by the power providing means, generates a wake-up signal to wake up a subsystem of the apparatus or the entire apparatus. In this context, a wake-up signal can be any type of analogical signal such as a simple rising edge or falling edge signal but also any wave form.

Preferably, the wake-up means can comprise a logic unit, in particular a microcontroller and/or logic gates. Microcontrollers typically have a low power consumption so that the energy provided by a mechanical excitation is sufficient for powering it up so that it can provide the necessary wake-up signal to the apparatus e.g. via a power switch. In addition, microcontrollers have low cost. Using logic components has the advantage that the time to get them ready is shorter so that applications that need a very fast wake-up out of a stand-by or power down mode can opt for this alternative. For both kinds of elements, the power supply voltage is of the order of 3 Volts and currents of the order of microamperes are necessary. These are requirements which can be met by the energy provided by the mechanical excitations provided by a user. Nowadays, microcontrollers can also run with nano power technology, reducing the energy needed to power them up thus decreasing the necessary power supply voltage and increasing the sensitivity of our system.

Advantageously, the device can further comprise an auxiliary power source, in particular a photoelectric cell or diodes. In case the electric power necessary to wake-up a device exceeds what can be typically achieved by mechanical excitation, such as knocking or pressing on the man-machine interface, the further necessary energy can be provided from the auxiliary power source. In this case, it is still not necessary to provide continuous power during a stand-by or power down mode as the energy provided by the mechanical impact can still be sufficient to enable the change in operational state and to switch on the auxiliary power supply. To be independent from power sources like batteries that may fail, it is further preferred to use the power of photoelectric cells or diodes.

The object is also achieved with an apparatus comprising a device as described and a man-machine interface or a housing coupled to the at least one means for transforming a mechanical excitation. With this apparatus, a stand-by or power down mode can be realised which does not need a high power or can even be realised with zero power. In addition, an accidental waking-up of the apparatus can be prevented as a mechanical impact on the apparatus is necessary to provide the necessary energy to wake up.

According to a preferred embodiment, the apparatus can further comprise a sensed signal treatment means configured to identify the location of an impact based on the signal sensed by the at least one means for transforming an excitation. In this case, a touch sensitive apparatus can be provided without needing additional hardware as, actually, the signal is provided by the means for transforming after the apparatus has been powered on again, and delivers all the necessary data to identify the location of an impact on the man-machine interface.

Advantageously, the sensed signal treatment means can furthermore be configured to determine the location of the impact, the energy of which was used to change the operational state. Indeed, in case the apparatus wakes up sufficiently fast, such that the electric signal properties can be analyzed it becomes possible to identify the location of the impact so that right from the start the apparatus can wake up in a desired mode, e.g. a entertainment system starts with playing a DVD or starts with a radio station.

Preferably, the apparatus can be configured such that in stand-by or power down mode the electric consumption is essential zero Watt. As mentioned above, it is the device for changing operational states which provides this advantageous possibility to save energy and a zero power mode can be obtained. In this case the device as described above does not need any further additional external or internal power source, neither during the stand-by or power down mode nor to wake up the apparatus.

Preferably, the signal treatment means can be configured such that the operational state is changed or not depending on the location of the impact. Thus upon identification of the location of the impact using the energy of the impact, powering up will not be realized for any location, e.g. on the surface of the apparatus, but only on a particular location.

According to a preferred embodiment, the signal treatment means can be configured such that each one of a plurality of different operational states is attributed to a predetermined area, and that upon the determination of the location of the impact the corresponding operational state is changed. Thus the device will wake up with a certain operational state, e.g.

depending on the location of impact an entertainment system will either wake up with playing a DVD, a CD or wake up with the radio.

The object of the invention is also achieved with the method according to claim 21. Accordingly, this method for changing the operational state of an apparatus, in particular from a stand-by or power down mode into an active state, comprises the steps of: providing a mechanical impact on a surface of the apparatus, in particular on a man-machine interface of the apparatus transforming the resulting mechanical excitation at least one electric signal, and obtaining at least the part, in particular all of the electric power necessary to change the operational state of the apparatus out of the at least one electric signal. With this method all the advantageous effects as already described above with respect to the device and/or the apparatus according to the invention, in particular zero Watt consumption during stand-by. To carry out the inventive method any one of the above described devices and/or the inventive apparatus can be used.

BRIEF DESCRIPTION OF DRAWINGS

Advantageous embodiments are according to the dependent claims. In the following various embodiments of the invention will be described in detail and in conjunction with the enclosed figures:

DETAILED DESCRIPTION OF THE INVENTION

Figure 1:
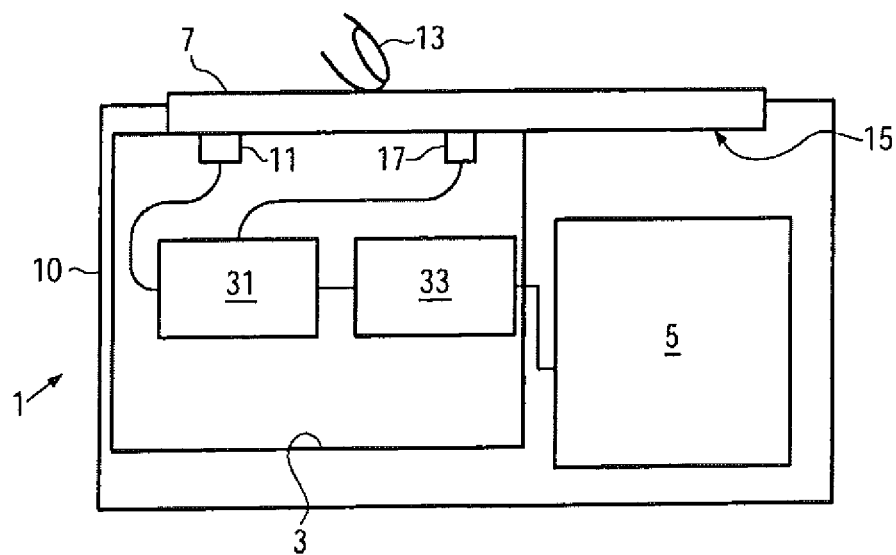
FIG. 1 illustrates a first embodiment of an apparatus comprising the device according to the invention.

FIG. 1 schematically illustrates an apparatus 1 which according to the invention comprises a device 3 for changing the operational state of the apparatus 1. In this embodiment device 3 is used to switch a sub system 5 of the apparatus 1 from stand-by or power down mode into an active state. The apparatus 1 can be any preferably electronic device, including but not limited to a handheld electronic device, a vending machine, a point of information, a point of sales, a home appliance including white goods and brown goods, an apparatus with touch screen, LEDS, a computer, a radiofrequency transceiver, or machines like air-conditioning and alarms. The sub system 5 can correspond to the apparatus 1 without the device 3 or to a part thereof.

The apparatus 1 furthermore comprises a man machine interface 7 which can be out of any material, rigid or soft, like e.g. leather, latex, silicone, plastic, glass, metal, wood, etc. and any shape, e.g. a plate or curved surface. The man machine interface 7 can for example be a touch sensitive panel arranged over a display or simply be the housing 10 of the apparatus 1.

Furthermore, the device 3 of apparatus 1 comprises a means for transforming 11 a mechanical excitation on the man machine interface 7, e.g. exerted by a fingertip 13 knocking, sliding or pressing thereon, into an electric signal. Typically, but without restricting the invention, the means for transforming is attached to the side 15 of the man machine interface 7 which is opposite to where the excitation 13 is exerted by a user such that the means for transforming 11 is invisible from the outside. Here an excitation is a mechanical excitation—including but not limited to a touch with a part of the body, a tool, a falling coin, including but not limited to static, dynamic, moving excitations—created directly or indirectly by a user on the man machine interface 7 or the housing 10 to interact with the apparatus 1 or subsystem 5.

In FIG. 1, the device 3 of the apparatus 1 according to the invention also comprises a second means for transforming 17. Nevertheless, the invention is not limited to this number and can comprise more or less means for transforming.

In this embodiment the means for transforming 11 is a transducer which can be, without however limiting the invention to this choice, a passive sensor, like a piezoelectric sensor, or a Polyvinylidene Fluoride. However according to a variant also an inductor could be used. In this case the mechanical excitation moves a metal part relative to the inductor so that an induced electric signal is obtained.

Figure 2A:
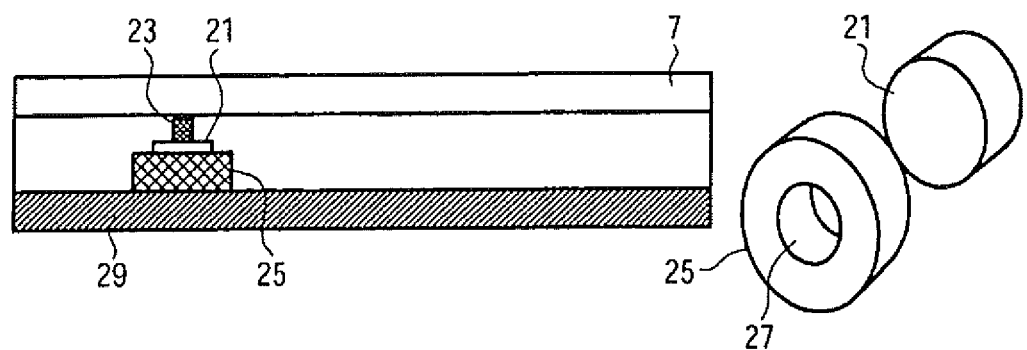
FIGS. 2a and 2b illustrate two mountings of a piezoelectric transducer according to the invention, FIGS. 3a and 3b schematically illustrate two possible ways of realising a power providing means as part of the device according to the invention.

Like mentioned above, the means for transforming 11, 17 is used to transform an excitation applied on the man machine interface 7 into an electric signal. According to a variant of the first embodiment, a piezoelectric sensor is used as the means for transforming 11, 17 and to improve the amount of energy transformed from the excitation, the piezoelectric sensor is used in the bending mode. When a mechanical force or vibration causes a piezoelectric sensor to bend, one layer or electrode is compressed and the other is stretched. Charge develops across each layer in an effort to counteract the imposed strains. Therefore increasing bending of the piezoelectric sensor increases the amount of energy transformed. FIG. 2a illustrates a corresponding mounting wherein the means for transforming 11, 17 comprises the piezoelectric sensor 21 sandwiched between a rigid excitation transmitting means 23 and a ring shaped rigid support 25. Instead of a ring any suitable shape with a central recessed area 27 can find its use. This structure is in turn sandwiched between the man machine interface 7 and a back plate 29. In this arrangement the piezoelectric sensor 21 functions in the bending mode and the ring shaped rigid support 25 serves as an amplifier which mechanically amplifies the bending of the piezoelectric sensor 21 and therefore improves the signal quality and amount of energy delivered. The piezoelectric sensor 21 could also be in direct contact with the man machine interface 7.

Figure 2B:
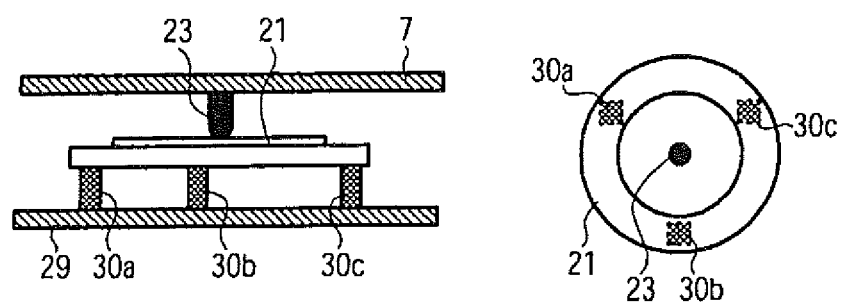

FIG. 2b illustrates another possible arrangement with a cross cut view on the left hand side and a top view on the right hand side. Elements with the same reference numerals like in FIG. 2a are not described in detail again, but their description is incorporated herewith by reference. Instead of using a ring shaped rigid support 25, as support for the piezoelectric sensor 21, a plurality of punctual support pillars 30a, 30b, 30c are used.

Device 3 forms a self-contained module which can actually be added to any kind of apparatus 1.

In the following, the inventive role of the device 3 used to change the operational state of the apparatus 1 like from a standby mode to an active state, will be describe in detail.

When a user touches the man machine interface 7 or the housing 10 of the apparatus 1 to interact with it, the device 3 can sense this touch via the means for transforming 11, 17. In case of an acoustic isolation of the man machine interface 7 from the rest of the housing according to a possible variant of the apparatus, only a touch on the man machine interface 7 can be sensed. The sensed signals are received by a power providing means 31 which reshapes the sensed electric signals—either individually or in combination—to supply a particular signal that is capable of supplying electric power to a wake-up means 33 of the device 3. Upon reception of the particular signal, the wake-up means is powered on and generates a wake-up signal to wake up the subsystem 5, implying that someone wants to use the apparatus 1, e.g. the electronic device functions of the apparatus.

By using a passive transducer 11, 17, such as piezoelectric sensor 21, together with the power providing means 31 that filters the energy generated by the impact on the surface 7, it becomes possible to change the operational state from stand by to active state without using an external power source and by simply hitting the man machine interface 7 like e.g. the housing 10. Thus, the energy of the excitation is used to power up the apparatus 1. In addition during stand by, there is no need to supply power to enable the waking up like in the prior art. It thus becomes possible to wakeup electronic devices without having to keep the device under power during stand by or power done (zero Watt). Therefore with the inventive device important energy savings can be achieved for any kind of apparatus that has a standby state.

More precisely, any mechanical excitation on the man-machine interface 7 or the housing 10 of the apparatus 1 generates mechanical vibration, energy or displacement that can be sensed by the transducer (piezoelectric sensor 21). In fact the means for transforming 11, 17 can sense any physical parameters, including but not limited to strain, pressure, vibration, acceleration, displacement and/or velocity. The means for transforming 11, 17 then transforms the mechanical energy into an electrical energy and generates an electrical signal directly proportional to the excitation. The power providing means 31 then filters the corresponding electrical signal or signals (in case of a plurality of means for transforming) in order to transform this signal into a particular signal capable of supplying power to the wake-up means 33, for example 3.3V DC voltage. The wake-up means 33, as soon as it is power supplied, generates a wake-up signal to wakeup a sub-system. This wakeup signal can be any type of analogical signal such as simple rising edge or falling edge logic signals or any particular complex waveforms.

The subsystem 5 can comprise a low drop out voltage regulator with its enable pin connected to the wake-up means 33, or any other subsystem that can switch from a power down mode to a running mode with a logic command state or any analogical signal. The complexity of the subsystem 5 can be from low to high, typically from a LED to a microcontroller based electronic board.

Figure 3A:
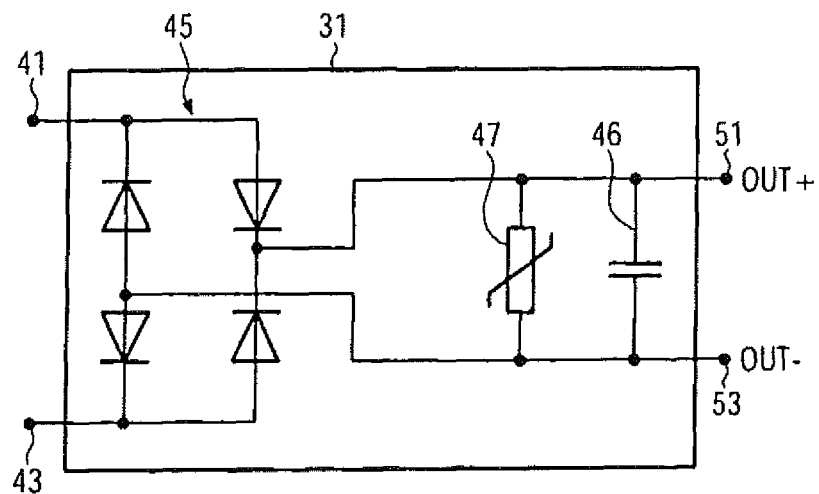

FIG. 3a schematically illustrates the structure of the power providing means 31. The power providing means 31 of this embodiment comprises input connections 41 and 43 which are connected to the at least one transforming means 11 (not shown) and via which the sensed electric signals are received by the power providing means 31.

In addition, the power providing means 31 comprises a bridge rectifier 45 coupled to the input connections 41 and 43. Thus both the positive and the negative part of the signal delivered by the transforming means 11, 17 can be used to obtain the necessary electric power to change the operational state of the apparatus 1.

The output of the bridge rectifier 45 (e.g. of a Schottky type) is connected to a varistor 47 which serves as a protection against surge voltage, in case the means for transforming provides a signal which has a voltage superior to the voltage which the elements downstream can support. Typically a varistor is used that clamps the output voltage of the bridge rectifier when the output voltage is greater than about 5V.

Instead of a varistor 47 it is possible to use any component suitable to limit the voltage output to prevent surge voltage. However, the component shall preferably be a passive component or at least not consume more power than delivered by the transforming means.

Finally a capacitance 49 serves as a energy stocking device to stock the energy coming from the means for transforming 11. In addition, the capacitance 49 can be used to smooth the signal at the output 51, 53 of the means for providing power 31. A suitable capacitance is of the order of 100 nF. The capacitance can be inserted before and/or after the component that protects from surge voltage. Other types of energy storage devices can be used and the invention is not limited to a capacitance. Instead of using only one capacitance also more capacitances could find their application according to the invention.

Figure 3B:
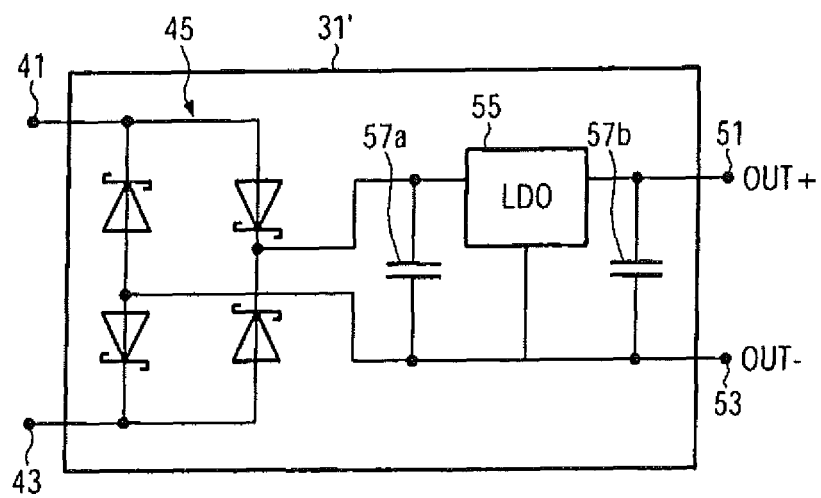

FIG. 3b illustrates a variant of the structure of the power providing means 31'. Here instead of using a varistor, a LDO voltage regulator 55 having the same function as the varistor is used. Furthermore instead of one capacitance 49, two capacitances 57a and 57b find their application. The other elements using the same reference numerals as already used in FIG. 3a, of the power providing means 31' correspond to the ones of the power providing means 31, their description is incorporated herewith by reference. In this case also the power in surge voltage can be used to wake-up.

In case that more than one transforming means are connected to the power providing means 31 or 31', like it is the case in the embodiment illustrated in FIG. 1, the structure can be adapted accordingly, e.g. by duplicating the structure at least from the input connections 41 and 43 until the bridge rectifier 45.

The power providing means 31 or 31' of this embodiment is made up of passive electronic components, but its function could also be realized using active components, such as low power comparator or operational amplifier together with an external power source, such as a capacitance, a rechargeable battery, energy harvesting devices, photo-diodes, solar cells etc. In this case, the detection level can be more precise and lower to increase the sensitivity of the device 3. Such a situation could for example occur, when the wakeup of the apparatus 1 is desired even in case of weak mechanical excitations. Active components can also find their application in case the energy of the signals provided by the transforming means 11, 17 is greater than the one needed to supply the wakeup unit power. The exceeding energy can then be used to charge the power source.

The wake-up means 33 of this embodiment comprises a microcontroller having a low power consumption with about 15 μA supply current and low cost. An Off command, directly linked to an input pin of the microcontroller, puts the apparatus 1 in power down mode and preferably in a state with zero power consuming, and an ON command, also directly linked to an input pin of the microcontroller, can force the apparatus 1 or a subsystem 5 thereof to change operational state and wakeup into an active state.

The wake-up means 33 furthermore comprises a power supply switch, e.g. a low drop out voltage regulator, to switch on the power supply of the apparatus 1 or a subsystem 5 thereof. As an alternative any other power switch component, like a static relay, can be used to switch on the power supply.

The wake-up means 33 has the following mechanism: When the output of the power providing means 31 is higher than a predetermined threshold, e.g. >1.8V the microcontroller is powered on using the energy provided by the power providing means 31 and its program starts to run.

Once the initialisation of the microcontroller is done, it sends a wake-up signal to the power supply switch, here the LDO voltage regulator. As a consequence, the LDO wakes up and powers on the total apparatus 1 or the subsystem 5 connected at its output pin. Once the voltage regulator is awake, it also powers the microcontroller to maintain the output voltage until an OFF command is send to the microcontroller.

To be able to change the operational state it is thus necessary that the signal provided by the power providing means 31 is long enough to last until the power switch is awake. It thus has to cover the microcontroller wakeup, the microcontroller execution and the LDO voltage regulator wakeup, in this embodiment. If the energy provided by the external mechanical excitation is thus not sufficient, the apparatus will not power up. Thus device 3 has a kind of internal threshold. In case one would like to power up the apparatus only at a threshold exceeding the internal threshold a further threshold means (not illustrated), preferably an adjustable means to adapt the threshold can be used.

For the above mentioned microcontroller with an internal frequency oscillator of around 2.5 MHz, the wakeup time of the microcontroller before the first instruction is executed is 1.84 ms ($t_{wake}$). The minimum voltage to power on the microcontroller is 1.8V and the current is 500 µA. Based on these values the varistor 47 and capacitor 49 parameters can be determined. In another configuration, a microcontroller with an internal frequency oscillator running at 32 KHz or 31 KHz can be used which has a lower current, down to 15 µA, but a higher wakeup time.

According to a variant, the wake-up means could also be realised with only logic components, such as AND, OR, XOR gates. In this case, the wake-up time of the wake-up unit can be lower than the one needed to power on a microcontroller, namely in the range of <500 ns. Thus for applications that need a fast wake-up, logic components preferably find their use. The power consumption depends on the type of component used, but it could be similar to the microcontroller's one: tens of micro amps. The need is for a power supply voltage of the order of 3V.

Figure 4:
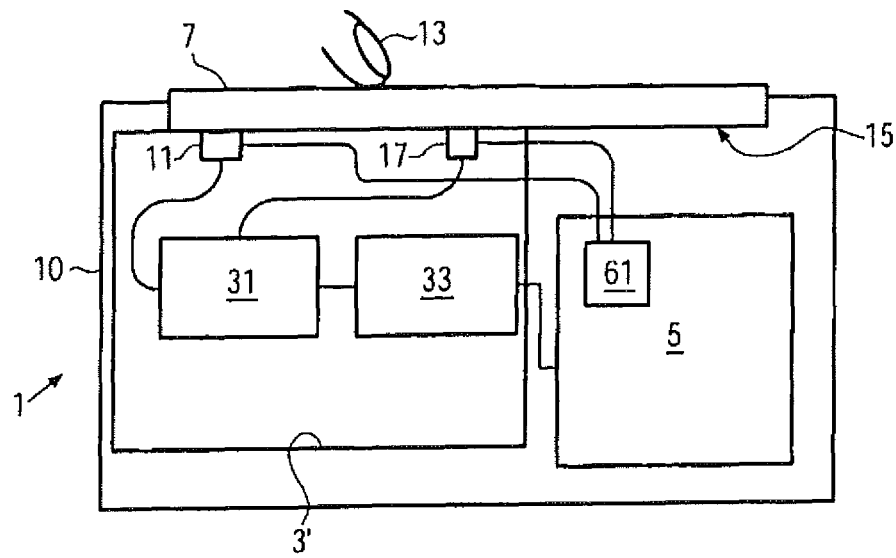
FIG. 4 illustrates a second embodiment of an apparatus comprising the device according to the invention, wherein the apparatus has a touch sensitive man machine interface.

FIG. 4 illustrates a second embodiment of the invention. The only difference between the first and second embodiment is that the means for transforming 11 and 17 are now also connected to a sensed signal treatment means 61 which is part of subsystem 5 of the apparatus. The other features correspond to the ones of the first embodiment and therefore have the same reference numerals as well as the same properties. Their description is therefore not repeated again but is incorporated herewith by reference to the description of the first embodiment.

The sensed signal treatment means 61 is configured such that upon the change of the operational state from stand by (power down) to the active state, the signals sensed by the transforming means 11 and 17 are used to identify the location of an impact namely the mechanical excitation of the man machine interface 7 to thereby provide a touch sensitive man machine interface using the same transforming means which provide the energy necessary for waking up.

In one variant of this embodiment the signal treatment means 61 is even configured such that the location of the impact on the man machine interface 7 which was used to wake-up the apparatus is determined. This is possible in case that at least the signal treatment means 61 is powered up fast enough such that the sensed signals of the waking up impact can still be analysed. By determining e.g. the x y coordinates of the waking up impact, the signal treatment means 61 can provide a signal to the control unit of the apparatus, that the apparatus shall wake up under a certain condition. E.g. in case of an entertainment system depending on the x y coordinates of the waking up impact, the system starts with playing a DVD or CD or starts with turning on the radio. In this case the x y coordinates can for example be attributed to impact areas which are linked to certain activities.

Figure 5:
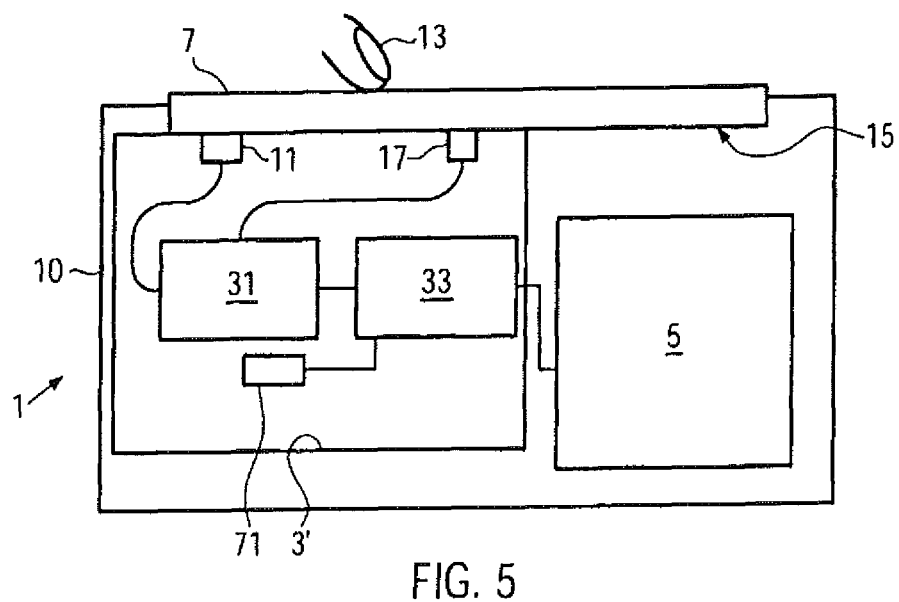
FIG. 5 illustrates a third embodiment of an apparatus comprising the device according to the invention which furthermore comprises an auxiliary power source.

FIG. 5 illustrates a third embodiment of the invention. The only difference between the first and third embodiment is that the device 3' further comprises an auxiliary power source 71. The other features correspond to the ones of the first embodiment and therefore have the same reference numerals as well as the same properties. Their description is therefore not repeated again but is incorporated herewith by reference to the description of the first embodiment. The third embodiment can of course also be combined with the additional features of the second embodiment according to the invention.

In this embodiment the auxiliary power source 71 is directly connected to the wake-up means 33. It could however also be connected to the power providing means 31. The auxiliary power source can be any kind of power supply such as capacitances, battery, piezoelectric cells, photoelectric cells, like solar cells, pyroelectric or thermoelectric converters, electrostatic harvesting and ambient radiation sources and are zero power consuming when the apparatus is in standby mode or power down mode.

Like in the first embodiment, the transforming means 11 and 17 perform the touch detection function and the energy provided by the mechanical excitation is used to provide a wake up signal, e.g. provided by the power providing means 31. The wake-up signal is used to switch on the auxiliary power source to provide the necessary electric power to the wake-up means 33. Thus the energy necessary to carry out the change in operational mode is provided by a combination of transformation of the mechanical excitation and auxiliary power source 71.

This embodiment finds its application when power switches require more energy to switch on the subsystem 5 or the apparatus such as static relays or RF transceiver. Thus in such cases the energy provided by the mechanical excitation, e.g. knocking or pressing, is not sufficient to move into the active state.

According to a variant the energy provided by power providing means 31 which is below the necessary threshold to provide a wake-up signal can be used to charge capacitors or batteries of the auxiliary power source 71.

Figure 6:
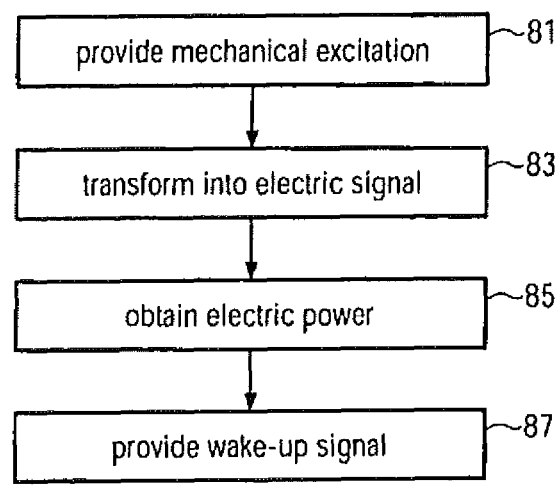
FIG. 6 represents a block diagram representing a fourth embodiment of the invention, namely the method to change the operational state of an apparatus.

FIG. 6 corresponds to a block diagram of a method according to a fourth embodiment according to the invention for changing the operational state of an apparatus like the one of one of the first to third embodiments, in particular from a standby or power down mode into an active state.

The first step 81 of the method consists in providing a mechanical impact on a surface of the apparatus, like on the man machine interface 7 of the apparatus 1. The mechanical impact corresponds to a mechanical excitation and can for example correspond to the pressing, knocking or sliding of a fingertip or any other part of a body but also of any tool on the surface of the apparatus like already described above.

Step 83 then consist in transforming the resulting mechanical excitation in at least one electric signal. To do so preferably a passive element is used like the above described passive transducers, like a piezoelectric sensor.

During the next step 85 at least a part of, in particular all, the electric power necessary to change the operational state of the apparatus is obtained out of the at least one electric signal. The energy can for example be stored in a capacitance 49, as described above.

Finally according to step 87 a wake-up signal is provided to change the operational state of the apparatus. The energy necessary to create the wake-up signal and in particular to switch on the power supply of the apparatus is taken from the electric power obtained in step 85. This step is e.g. carried out by the low drop out voltage regulator of wake up means 33 which provides a voltage sufficient to activate a relay that can power on the apparatus.

By doing so it is no longer necessary to continuously provide power during the standby mode so that important energy savings can be obtained. Furthermore by allowing the change of the operational stage only upon detection of a mechanical impact, makes the method save against the unintentional powering up based on acoustic noise.

The invention claimed is:

1. A device for changing the operational state of an apparatus, comprising:
    at least one means for transforming a mechanical excitation, applied to the surface of the apparatus, into an electric signal,
    the at least one means for transforming comprising a passive transducer and a means for amplifying the excitation,
    the passive transducer disposed between a rigid excitation transmitting means and a support with a central recessed area; and
    a power providing means for supplying at least a part of the electric power necessary to enable a change of the operational state of the apparatus from a zero power or power down mode into an active state,
    wherein the electric power is obtained out of the electric signal.

2. Device according to claim 1, wherein the passive transducer is a piezoelectric transducer configured to function in bending mode.

3. Device according to claim 1, wherein the support comprises a plurality of pillars.

4. Device according to claim 1, wherein the power providing means comprises a voltage peak preventing means.

5. Device according to claim 4, wherein the power providing means further comprises a rectifier.

6. Device according to claim 1, wherein the power providing means further comprises an energy storage means.

7. Device according to claim 1, further comprising an auxiliary power source comprising at least one of a photoelectric cell, a diode, a capacitance, a battery, a piezoelectric cell, a pyroelectric or thermoelectric converter, an electrostatic harvesting source, or an ambient radiation source.

8. A device for changing the operational state of an apparatus, comprising:
    at least one means for transforming a mechanical excitation, applied to the surface of the apparatus, into an electric signal, comprising a passive transducer disposed between a rigid excitation transmitting means and a support with a central recessed area;
    a power providing means for supplying at least a part of the electric power necessary to enable a change of the operational state of the apparatus from a zero power or power down mode into an active state; and
    a wake-up means configured to generate a wake-up signal for changing the operational state of at least a sub-system of the apparatus,
    wherein the electric power is obtained out of the electric signal.

9. Device according to claim 8, wherein the passive transducer is a piezoelectric transducer configured to function in bending mode.

10. Device according to claim 8, wherein the wake-up means comprises a logic unit.

11. Device according to claim 8, further comprising an auxiliary power source comprising at least one of a photoelectric cell, a diode, a capacitance, a battery, a piezoelectric cell, a pyroelectric or thermoelectric converter, an electrostatic harvesting source, or an ambient radiation source.

12. Device according to claim 8, configured such that the energy provided by the power providing means which is below a threshold provides a wake-up signal used to charge the auxiliary power source, the auxiliary power source being a capacitor or battery.

13. Device according to claim 4, wherein the voltage peak preventing means is a a low drop out voltage regulator or varistor.

14. Device according to claim 4, wherein the power providing means further comprises a Schottky bridge rectifier.

15. Device according to claim 6, wherein the energy storage means is at least one capacitor.

16. Device according to claim 10, wherein the logic unit is a microcontroller or logic gates.

17. Device according to claim 10, wherein the wake-up means comprises a microcontroller and logic gates.

18. Device according to claim 12, wherein the auxiliary power source is a capacitor.

19. Device according to claim 12, wherein the auxiliary power source is a battery.

* * * * *